United States Patent [19]

Starp

[11] 4,355,876

[45] Oct. 26, 1982

[54] CONTROL DEVICE HAVING AN INTERNAL ELECTRIC OR VOLTAGE SOURCE

[76] Inventor: Franz Starp, Mittlere Steige 36, 7547 Wildbad 5, Fed. Rep. of Germany

[21] Appl. No.: 244,474

[22] Filed: Mar. 16, 1981

[30] Foreign Application Priority Data

Mar. 18, 1980 [DE] Fed. Rep. of Germany ....... 3010304

[51] Int. Cl.$^3$ ........................ G03B 17/00; H01R 13/62

[52] U.S. Cl. ..................................... 354/202; 354/354

[58] Field of Search ................. 354/75, 76, 60 R, 202, 354/50, 51, 288, 295, 354, 258, 38; 339/34, 75 M, 119 R; 307/149, 150; 361/334, 356, 426; 455/347, 348, 349, 351

[56] References Cited

U.S. PATENT DOCUMENTS 3,640,623 2/1972 Florsheim et al. ............. 354/202 X 3,917,372 11/1975 Selinko ............................ 339/75 M

*Primary Examiner*—Donald A. Griffin

*Assistant Examiner*—William B. Perkey

[57] ABSTRACT

A control device, particularly for use as a power supply for photographic equipment, having an internal power supply connectable to a current consumer of the control device by means of a plug and coupling, to which optionally an external power supply may be connected by a plug member the connection of which effectively disconnects the internal power supply.

10 Claims, 4 Drawing Figures

Fig. 1
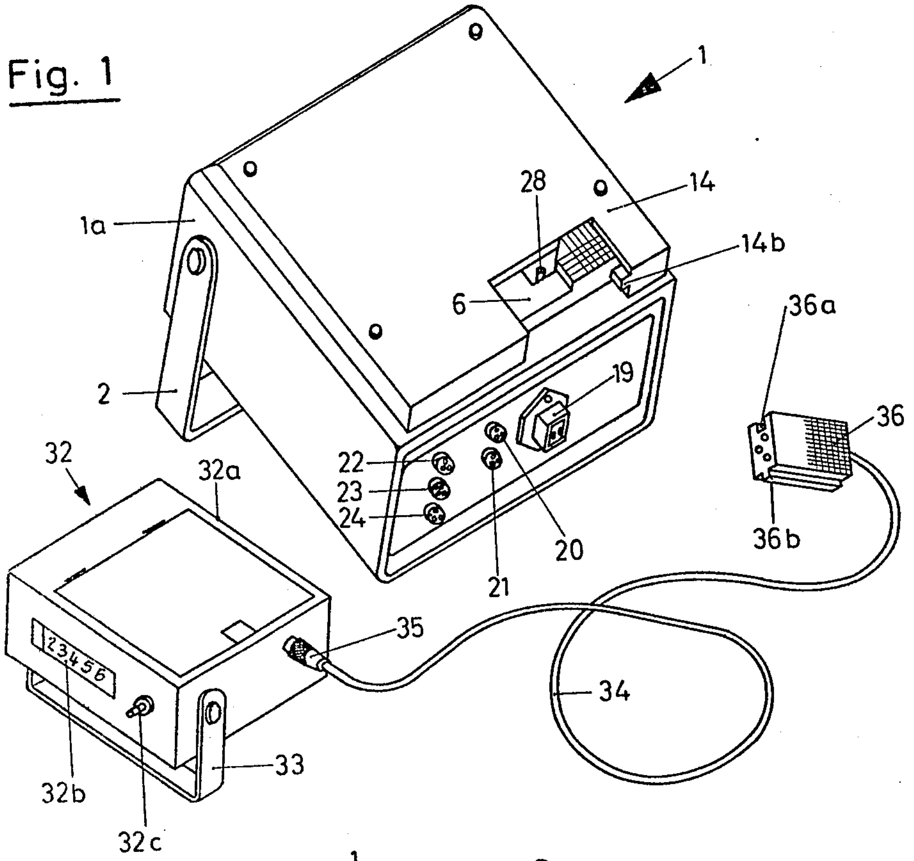
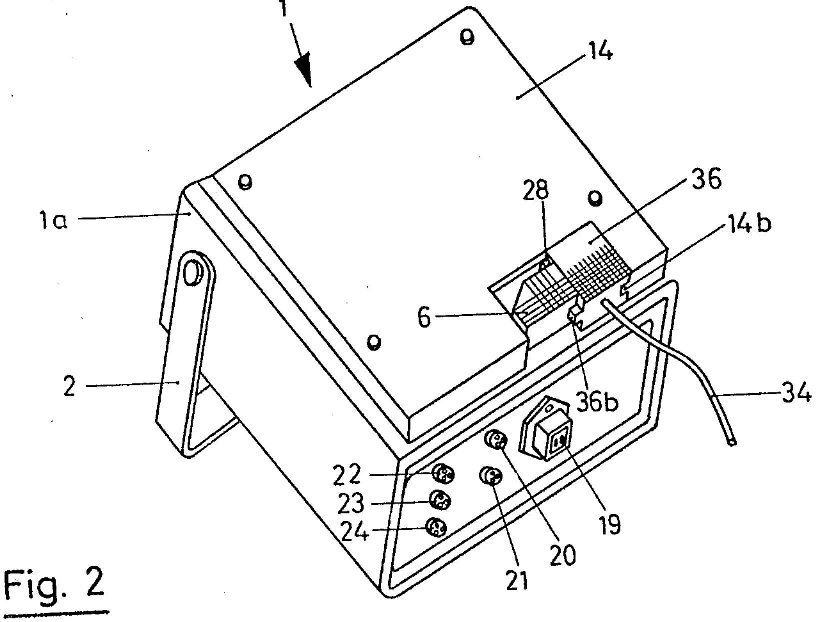
Fig. 2

CONTROL DEVICE HAVING AN INTERNAL ELECTRIC OR VOLTAGE SOURCE

The invention relates to a device having a built-in electric or voltage source and one or more current consumers supplied thereby, more and especially a control device for setting, measuring and controlling exposure parameters in a photographic camera connectable thereto and which is fitted with an electrically operated magnetic shutter.

In control devices of the above kind, it is known to supply the current consumer or consumers directly with current from the control device, or after actuating a change-over switch arranged on the apparatus, via a special mains device, the connection of which disconnects the battery in the device.

The object of the invention is the further development of a control device of the aforesaid kind in the respect that during changeover of the current consumer from the internal battery to an external battery and vice versa, the change-over switch and the manipulations connected therewith may be dispensed with.

According to the present invention there is provided a device having an internal energy or voltage source, i.e. an internal electrical power source, provided in the housing thereof and one or more current users supplied thereby, more especially a control device for setting, measuring and operating exposure parameters in a camera connectable thereto, which is provided with an electric or battery operated magnetic shutter, wherein, between the internal energy and voltage source and current user, a plug coupling is provided on the housing by means of which either a plug member connected to the internal energy or voltage source, or a plug member of an external energy or voltage source, i.e. a separate and independent external electrical power source, is connectable to supply said current user.

In this manner it is possible to obtain a structural simplification of the control device and also a simplification of operation during the changeover of the battery terminal from one to the other energy or voltage source in that only plug members are exchanged and beyond that, no more changeover functions are required.

Preferably, it is proposed, moreover, for the plug member of the internal energy or voltage source to be both secured against being pulled off and displaceably mounted in the housing, whilst the plug member of the external energy or voltage source is removably insertable in the device housing or pluggable on to the device-mounted plug coupling.

Further, the plug member of the internal energy source and the plug member of the external energy or voltage source are preferably fashioned as flat components, in the manner of sliders, and such that on their lateral guide edges and in the socket receiving region they have co-operable groove and tongue profilings.

For the purpose of bringing about a certain forced guidance of the plug coupling it is proposed that the plug member associated with the internal energy or voltage source is displaceable in all directions in its own plane by means of a gate-like guide and locatable in and out of the contact position by stop pins.

The present invention will be described further, by way of example, with reference to the accompanying drawings, in which:

FIG. 1 is a control device for photographic cameras, shown with its base surface uppermost and with its rear housing surface visible, showing a socket coupling for connection of one or several batteries either incorporated in the control device itself or a separate carrier box;

FIG. 2 shows the plug member associated with a separate battery connected to the plug member on to the control device;

Figure 3:
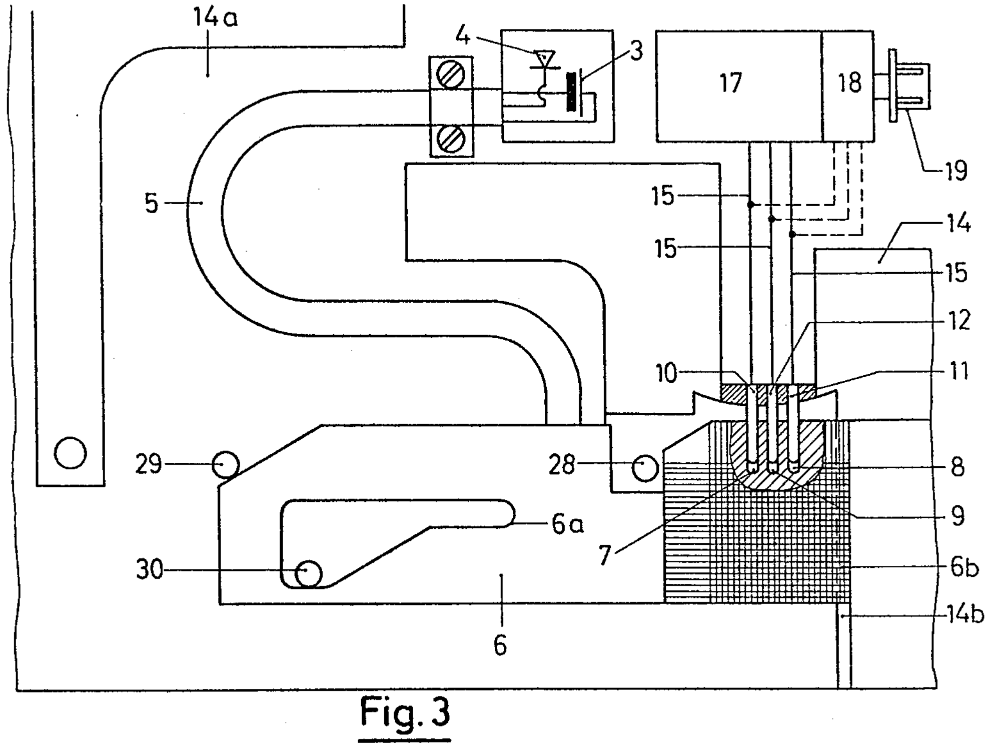
FIG. 3 shows the plug and socket coupling of FIG. 1 on an enlarged scale.

In the drawings, the housing 1*a* of a control device 1 has a U-shaped yoke 2 by means of which the device 1 may be carried or supported. The device 1 shown relates, for example, to such devices as are provided with electronic arrangements, i.e. one or more current users, for setting, measuring and operating exposure parameters and adapted to be attached to a photographic camera, not further shown, the shutter of which is an electrically operated magnetic shutter and hence is dependent upon supplying or feeding it with electrical energy. This may be obtained by the aforesaid current users from an energy or voltage source 3 (FIGS. 3, 4) built into the control device 1, and which is preferably a rechargeable NiCad-battery and is provided with a diode 4, performing the function of a thermal sensor. Both the voltage source 3 and the diode 4 have a plug member 6 connected thereto by means of a three-core cable 5, which plug member 6, with its plug sockets 7, 8 and 9, is adapted to be connected to a plug member provided on the control device 1 comprising three contact pins 10, 11 and 12. The plug member comprising pins 10, 11 and 12 is, in turn, electrically connected by means of a three-core cable 15, secured to the base plate 14 of the device 1, to the aforesaid one or more current users 17 in the interior of the control housing. Recharging of the battery 3 accommodated in the control housing 1 occurs via a charger 18, only indicated schematically in FIGS. 3 and 4, whilst by-passing the current users 17, and which may be connected to the mains supply by means of a plug and socket connection 19 located on the rear surface of the control device 1.

Thus, energy or voltage source 3 constitutes a disconnectable and rechargeable internal electrical power source in control device 1, removably connectable with and disconnectable from the plug member or plug coupling formed by contact pins 10, 11 and 12 of the current user 17 via the socket formed by the plug sockets 7, 8 and 9 of the plug member 6.

With the exception of setting the objective lens, which is effected manually, the magnetic shutter of the camera, not shown, receives all control impulses from the control device 1, which on its rear surface is provided with several coded plug sockets 20, 21, 22, 23 and 24 of which the plug sockets 20 and 21 serve for the connection of the magnetic shutter and a photometric probe, whilst further socket connectors 22, 23 and 24 are provided for a flash device, an adaptor for opening and closing the shutter for the purpose of focal plane viewing, and for an electric cable connection for releasing the shutter.

Figure 4:
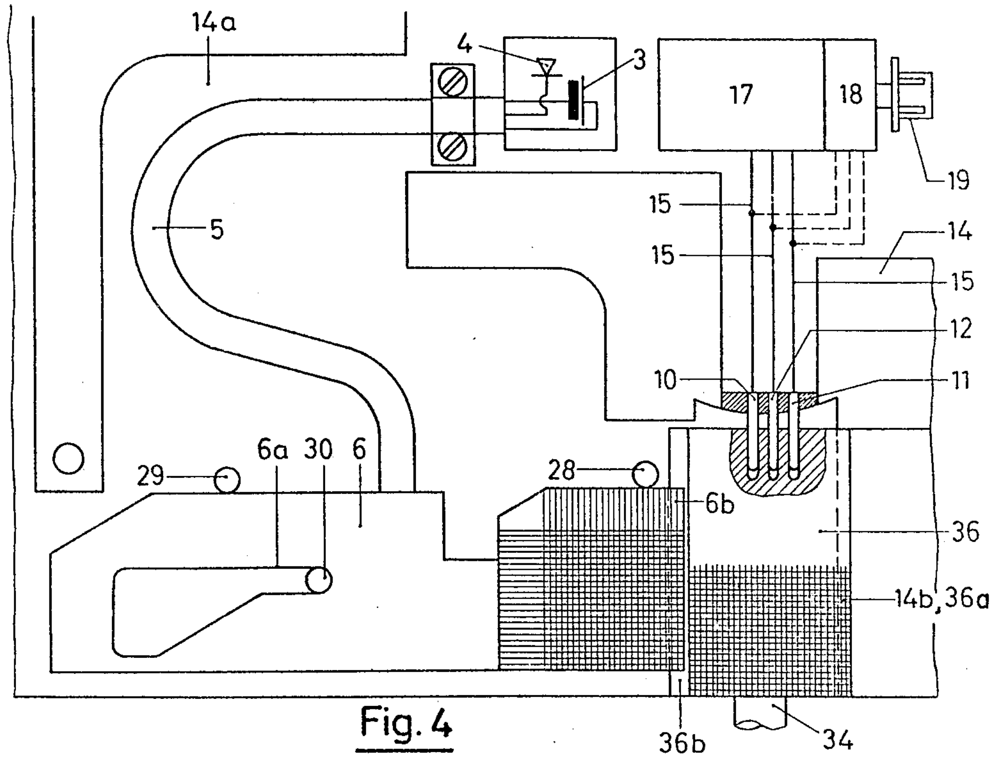
FIG. 4 shows the plug and socket coupling of FIG. 2 on an enlarged scale.

As shown especially from FIGS. 3 and 4, the plug member 6 of the energy or voltage source 3 accommodated in the control housing 1*a* is formed as a slide, displaceable linearly in a recess 14*a* and pivotal in the movement plane. Several webs or pins 28, 29 and 30 are provided in the recess 14*a* of which pins the latter 30 is positioned in a gate-like and displacement limiting guide or recess 6*a* of the displaceable and pivotable plug member 6. The pins 28, 29 and 30 are provided to guide the plug member 6, to prevent it from being pulled off completely and also to impart thereto a positionally correct location, especially in conjunction with the coaction between pin 30 and the displacement limiting recess 6*a* of plug member 6, i.e. particularly when the plug member 6 is disconnected, as in FIG. 4. A guide for simplifying the plugging-in of the plug member 6 on to the pins 10, 11 and 12 mounted on the device 1 and extending in parallel to these contact pins 10, 11, 12 is attained if the profilings are provided in the form of a tongue 14*b* and a groove 6*b* on the lateral contacting surfaces of recess 14*a* and plug member 6 during the pushing of the plug member 6 on to the pins 10, 11 and 12 mounted on the device 1.

Thus, the surface portions of recess 14*a*, pins 28, 29 and 30 and tongue 14*b*, constitute reception guide means on the control device 1, and the adjacent outer, e.g. peripheral, and inner, e.g. recess 6*a*, pin limiting and groove 6*b*, surface portions of slide plug member 6, constitute coacting counterpart insertion guide means for displacing plug member 6 for operatively connecting and disconnecting the internal electrical power source 3 via plug member 6 with the current users 17 via the plug member or plug coupling therefor formed of the contact pins 10, 11 and 12.

In view of the fact that the control device 1 is provided with its own energy or voltage source 3 serving to supply the current users 17, thus being independent of the mains current, the control device 1 may be used in combination with a photographic camera both in the studio and outdoors. In the latter case it is important, however, that the available capacity of the internal battery is adequate for carrying out the intended exposures, because as already stated above, the recharging of the battery 3 via the rectifier 18 requires a mains connection which is not available outdoors.

For certain applications, in which it is clear that the capacity of the battery 3 built into the control device is not adequate and also that conditions for recharging do not exist due to the lack of a suitable mains supply, a large battery 32 is provided which is composed of a particular number of NiCad batteries interchangeably accommodated in a portable box 32*a*. As with the control device 1, the housing 32*a* of the large battery 32 may also be provided with a carrying and supporting yoke 33. Since it is necessary to ensure that the control device 1, even for an extended period of use, will be able to perform its intended use independently of the mains current, the charge capacity of the battery 32 is selected to be relatively large. It may and it should amount to a multiple of that of the battery 3 which is accommodated in the control housing 1*a*. Similarly the set of batteries in the separate housing 32*a* has a diode associated therewith carrying out the function of a thermal sensor. The connection of the large battery 32 to the control device 1 is effected by using a three-core cable 34 one end of which is connectable by means of a coded contact plug 35 to the battery housing, and its other end leading into a plug member 36 which, in place of the plug member 6, is pluggable on to the pins 10, 11 and 12 fixed to the housing, as shown in FIGS. 2 and 4. Thus, it is necessary to note that the plug member 6 has first to be disconnected from the pins 10, 11 and 12, i.e. unplugged therefrom, and moved into the lateral position defined by the fixed pins 28 and 30 i.e. moved outwardly or downwardly and then to the left from the position shown in FIGS. 1 and 3 to that shown in FIGS. 2 and 4.

On assumption of this position by the plug member 6, it simultaneously acts as a guide for the plug member 36 which is provided at its lateral surfaces with a groove 36*a* and a tongue 36*b* engaging with tongue 14*b* and groove 6*b* respectively. When the external large battery 32 is connected to the control device 1, the battery 3 located in housing 1*a* is disconnected, which means that the combination of the plug member 6 and the plug member 36 of the external battery 32, besides the plug function, also acts as an on/off switch for the internal battery 3. If the control device 1 is connected to the mains supply via the plug connector 19, energy storage occurs via the rectifier or the charger 18, thus charging the battery 3 or 32, the plug member 6 or 36 of which is plugged on to the pins 10, 11 and 12. For the purpose of checking its charge capacity, the large battery 32 is provided with an indicating device 32*b* and a test button 32*c*, the actuation of which connects a test device to the battery voltage.

Thus, battery 32 constitutes a separate and independent connectable and rechargeable external energy or voltage source, i.e. a separate an independent connectable and rechargeable external electrical power source, in the correspondingly separate and independent portable housing 32*a*, removably connectable with the plug member or plug coupling formed by contact pins 10, 11 and 12 of the current users 17 of the control device 1 via the plug member 36. In this case, the surface portions of the groove 6*b* of the plug member 6 in disconnected position, and those of the plug members 6 in coacting contact with the adjacent surface portions of recess 14*a* and pins 28, 29 and 30, plus the surface portions of the opposed tongue 14*b*, constitute disconnected position or adjusted position composite reception guide means on the device 1, and the adjacent surface portions of the opposed tongue 36*b* and groove 36*a* of the plug member 36 constitute coacting counterpart insertion guide means, for operatively removably connecting and disconnecting the separate and independent external electrical power source 32 via plug member 36 with the current users 17 via the plug member therefor formed of the contact pins 10, 11 and 12.

The plug connection in accordance with the invention with regard to its applicability is not limited to a control device for photographic cameras, but may be used wherever it is a question of connecting the current user of a device either to an internal battery located in the device having a limited charge capacity, or to an external battery having a greater charge capacity.

As is clear from the drawing, therefore, according to the present invention a device is provided, comprising a housing including at least one current user having an electrical power receiving plug coupling on the housing and operatively arranged for directly receiving electrical power for operating the current user upon connection with a power source plug member, i.e. without the need for a change over switch, an internal electrical power source in the housing and having a displaceable internal power plug member removably connectable to the current user plug coupling and operatively arranged for directly supplying electrical power from the internal power source upon connection of the internal plug member to the current user plug coupling, i.e. without the need for a change over switch, and guide means, e.g.

tongue 14*b*, pins 28, 29 and 30, and the adjacent portions of recess 14*a*, plus groove 6*b*, displacement limiting guide recess 6*a* and the adjacent portions of internal plug member 6, for guiding the internal plug member for displacement between a connected position with the plug coupling (FIGS. 1 and 3) and a disconnected position (FIGS. 2 and 4) sufficiently spaced therefrom to provide a reception region (i.e. the area in the housing occupied by the external plug member 36 in FIGS. 2 and 4) for permitting a separate external electrical power source to be connected to the current user plug coupling thereat, i.e. without the need for a change over switch.

More particularly, the guide means, e.g. base plate 14, recess 14*a* and pins 28, 29 and 30, are arranged for retaining the internal plug member against separation from the housing in any position of displacement thereof relative to the current user plug coupling.

Hence, a separate external power source may be provided having a separate external power plug member removably connectable to the current user plug coupling and operatively arranged for directly supplying electrical power from the external power source upon connection of the external plug member to the current user plug coupling when the internal plug member is in the disconnected position, i.e. without the need for a change over switch.

More specifically, the current user plug coupling is secured on the housing, the housing has reception guide surface portions, e.g. base plate 14, recess 14*a*, pins 28, 29 and 30, and tongue 14*b*, mounted thereon, and the internal plug member and external plug member are formed as flat slidable members (cf. FIG. 1) respectively having corresponding counterpart insertion guide surface portions, e.g. groove 6*b*, recess 6*a* and the perimetric outer profile of internal plug member 6, and groove 36*a* and tongue 36*b* of the plug member 36, arranged for coacting with the reception guide surface portions upon corresponding connection to the current user plug coupling.

In this regard, such guide surface portions may thus include corresponding cooperating tongue and groove coacting reception and insertion surface portions.

In particular, the internal plug member has displacement limiting guide means, e.g. recess 6*a* and the perimetric outer profile of internal plug member 6, and the housing has cooperating stop means, e.g. pins 28, 29 and 30 and base plate 14, arranged for coacting with the displacement limiting guide means for controlling the disposition of the internal plug member for displacement in all directions in its own plane, i.e. in the plane in which the flat slidable member 6 slides, and for locating the internal plug member in the connected position and in the disconnected position (cf. FIGS. 3 and 4).

Moreover, the internal plug member preferably has a lateral guide surface portion, e.g. groove 6*b*, arranged adjacent to the reception region of the housing when the internal plug member is in the disconnected position, and the external plug member correspondingly preferably has a counterpart opposed lateral guide surface portion, e.g. tongue 36*b*, arranged adjacent to the internal plug member lateral guide surface portion for guiding coaction therewith upon connection of the external plug member to the current user plug coupling.

Such device may be specifically contemplate a control device for setting, measuring and operating exposure parameters in a camera of the type having an electrically operated magnetic shutter and operatively connectable to the control device, comprising a housing including at least one current user having an electrical power receiving plug coupling secured on the housing and operatively arranged for directly receiving electrical power for operating the current user upon connection with a power source plug member, an internal electrical power source operatively arranged in the housing and having a displaceably retained internal power plug member removably connectable to the current user plug coupling and operatively arranged for directly supplying electrical power from the internal power source upon connection of the internal plug member to the current user plug coupling, and guiding and retaining means for guiding the internal plug member for displacement between a connected position with the plug coupling and a disconnected position sufficiently spaced therefrom to provide a reception region permitting a separate external electrical power source to be connected directly to the current user plug coupling thereat and for retaining the internal plug member against separation from the housing in any position of displacement thereof relative to the current user plug coupling, and in combination therewith a separate external power source having a separate external power plug member removably connectable to the current user plug coupling and operatively arranged for directly supplying electrical power from the external power source upon connection of the external plug member to the current user plug coupling when the internal plug member is in the disconnected position.

More particularly, in this arrangement the housing has reception guide means and displacement guide means, e.g. as indicated specifically above, the internal plug member has counterpart insertion guide means and counterpart displacement guide means, e.g. as indicated specifically above, the external plug member has counterpart insertion guide means, e.g. as indicated specifically above, the housing reception guide means and displacement guide means and the internal plug member counterpart insertion guide means and counterpart displacement guide means are arranged for coaction for guiding the internal plug member for connection to the current user plug coupling and for limited displacement between the connected position and the disconnected position, and the housing reception guide means, the internal plug member counterpart insertion guide means and the external plug member counterpart insertion guide means are arranged when the internal plug member is in the disconnected position for guiding the external plug member for connection to the current user plug coupling.

I claim:

1. Device comprising a housing including at least one current user having an electrical power receiving plug coupling on the housing and operatively arranged for receiving electrical power for operating the current user upon connection with a power source plug member, an internal electrical power source in the housing and having a displaceable internal power plug member removably connectable to the current user plug coupling and operatively arranged for supplying electrical power from the internal power source upon connection of the internal plug member to the current user plug coupling, and guide means for guiding the internal plug member for displacement between a connected position with the plug coupling and a disconnected position sufficiently spaced therefrom to provide a reception region permitting a separate external electrical power source to be connected to the current user plug coupling thereat.

2. Device according to claim 1 wherein the guide means are arranged for retaining the internal plug member against separation from the housing in any position of displacement thereof relative to the current user plug coupling.

3. Device according to claim 1 wherein a separate power source is provided having a separate external power plug member removably connectable to the current user plug coupling and operatively arranged for supplying electrical power from the external power source upon connection of the external plug member to the current user plug coupling when the internal plug member is in the disconnected position.

4. Device according to claim 3 wherein the guide means are arranged for retaining the internal plug member against separation from the housing in any position of displacement thereof relative to the current user coupling.

5. Device according to claim 4 wherein the current user plug coupling is secured on the housing, the housing has reception guide surface portions mounted thereon, and the internal plug member and external plug member are formed as flat slidable members respectively having corresponding counterpart insertion guide surface portions arranged for coacting with the reception guide surface portions upon corresponding connection to the current user plug coupling.

6. Device according to claim 5 wherein such guide surface portions include corresponding cooperating tongue and groove coacting reception and insertion surface portions.

7. Device according to claim 6 wherein the internal plug member has displacement limiting guide means and the housing has cooperating stop means arranged for coaction with the displacement limiting guide means for controlling the disposition of the internal plug member for displacement in all directions in its own plane and for locating the internal plug member in the connected position and in the disconnected position.

8. Device according to claim 7 wherein the internal plug member has a lateral guide surface portion arranged adjacent to the reception region when the internal plug member is in the disconnected position, and the external plug member has a counterpart opposed lateral guide surface portion arranged adjacent to the internal plug member lateral guide surface portion for guiding coaction therewith upon connection of the external plug member to the current user plug coupling.

9. Device, such as a control device for setting, measuring and operating exposure parameters in a camera of the type having an electrically operated magnetic shutter an operatively connectable to the control device, comprising a housing including at least one current user having an electrical power receiving plug coupling secured on the housing and operatively arranged for directly receiving electrical power for operating the current user upon connection with a power source plug member, an internal electrical power source operatively arranged in the housing and having a displaceably retained internal power plug member removably connectable to the current user plug coupling and operatively arranged for directly supplying electrical power from the internal power source upon connection of the internal plug member to the current user plug coupling, and guiding and retaining means for guiding the internal plug member for displacement between a connected position with the plug coupling and a disconnected position sufficiently spaced therefrom to provide a reception region permitting a separate external electrical power source to be connected directly to the current user plug coupling thereat and for retaining the internal plug member against separation from the housing in any position of displacement thereof relative to the current user plug coupling, and a separate external power source having a separate external power plug member removably connectable to the current user plug coupling and operatively arranged for directly supplying electrical power from the external power source upon connection of the external plug member to the current user plug coupling when the internal plug member is in the disconnected position.

10. Device according to claim 9 wherein the housing has reception guide means and displacement guide means, the internal plug member has counterpart insertion guide means and counterpart displacement guide means, the external plug member has counterpart insertion guide means, the housing reception guide means and displacement guide means and the internal plug member counterpart insertion guide means and counterpart displacement guide means are arranged for coaction for guiding the internal plug member for connection to the current user plug coupling and for limited displacement between the connected position and the disconnected position, and the housing reception guide means, the internal plug member counterpart insertion guide means and the external plug member counterpart insertion guide means are arranged when the internal plug member is in the disconnected position for guiding the external plug member for connection to the current user plug coupling.

* * * * *